US009424651B2

United States Patent
Malesa et al.

(10) Patent No.: US 9,424,651 B2
(45) Date of Patent: Aug. 23, 2016

(54) METHOD OF TRACKING MARKER AND ELECTRONIC DEVICE THEREOF

(71) Applicant: Samsung Electronics Co., Ltd., Gyeonggi-do (KR)

(72) Inventors: Piotr Malesa, Sulejowek (PL); Jaroslaw Karciarz, Warsaw (PL); Slawomir Jozef Wojcik, Jaworzno (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/680,870

(22) Filed: Apr. 7, 2015

(65) Prior Publication Data

US 2015/0286867 A1    Oct. 8, 2015

(30) Foreign Application Priority Data

Apr. 7, 2014 (KR) .................. 10-2014-0041258

(51) Int. Cl.
*G06K 9/00* (2006.01)
*G06T 7/00* (2006.01)
*G06T 7/20* (2006.01)
*G06K 9/32* (2006.01)

(52) U.S. Cl.
CPC ............ *G06T 7/0075* (2013.01); *G06T 7/2033* (2013.01); *G06K 2009/3225* (2013.01); *G06T 2207/10016* (2013.01); *G06T 2207/30204* (2013.01)

(58) Field of Classification Search
None
See application file for complete search history.

(56) References Cited

U.S. PATENT DOCUMENTS

| 5,748,761 | A | 5/1998 | Chang et al. |
| 5,856,844 | A | 1/1999 | Batterman et al. |
| 6,711,293 | B1 | 3/2004 | Lowe |
| 7,343,278 | B2 | 3/2008 | Billinghurst et al. |
| 7,809,194 | B2 | 10/2010 | Zhang et al. |
| 7,912,248 | B2 | 3/2011 | Tanaka |
| 7,987,079 | B2 | 7/2011 | Billinghurst et al. |
| 2009/0238460 | A1 | 9/2009 | Funayama et al. |
| 2011/0134108 | A1 | 6/2011 | Hertenstein |
| 2011/0305368 | A1* | 12/2011 | Osako ............... G06T 7/0044 382/103 |
| 2013/0148851 | A1* | 6/2013 | Leung ............... G06K 9/3241 382/103 |

OTHER PUBLICATIONS

Kato, et al.; "Marker Tracking and HMD Calibration for a Video-based Augmented Reality Conferencing System";2nd IEEE and AM International Workshop on Augmented Reality; San Francisco, CA; Oct. 20-21, 1999; pp. 85-94.
Fischler, et al.; "Random Sample Consensus: A Paradigm for Model Fitting with Applications to Image Analysis and Automated Cartography"; SRI International; Mar. 1980; 40 pages.
Jeff Brown; "ZBar bar code reader"; Online htt;://zbar.sourceforge.net/; last modified Jul. 15, 2011; 3 pages.
Open Source Project; ZXing "Zebra Crossing"; GitHub; http://code.google.com/p/zxing/ . . . 2012; 3 pages.

* cited by examiner

*Primary Examiner* — Stephen R Koziol
*Assistant Examiner* — Amandeep Saini

(57) ABSTRACT

Disclosed are a method and an apparatus for tracking a marker. The method of tracking a marker by an electronic device includes: detecting a position of a marker in a first frame; tracking a position of the marker in a second frame based on the position of the marker detected in the first frame; and estimating a 3D position based on the tracked position of the marker. Further, the method of tracking a marker is implemented through various embodiments.

20 Claims, 9 Drawing Sheets

METHOD OF TRACKING MARKER AND ELECTRONIC DEVICE THEREOF

CROSS-REFERENCE TO RELATED APPLICATION

The present application is related to and claims priority under 35 U.S.C. §119(a) to Korean Application Serial No. 10-2014-0041258, which was filed in the Korean Intellectual Property Office on Apr. 7, 2014, the entire content of which is hereby incorporated by reference.

TECHNICAL FIELD

The present disclosure relates to a technology for tracking a position of a marker in an electronic device.

BACKGROUND

Electronic devices have been developed as multimedia devices that provide various services such as a voice and video call function, an information input/output function, and data transmission or reception.

Recently, various pieces of information are frequently shared through a quick response (QR) code. Information on the QR code is provided offline and online. According to various embodiments, when a user scans a QR code of one product in a paper magazine through a camera of an electronic device, the user is linked to a website of the corresponding product and acquires various pieces of product information such as information on the production, circulation, and price, event information, and coupons. Further, when the user scans a QR code of a sports game or a movie poster through the camera, the user receives promotional video and picture information, coupon and ticket information, and cinema or stadium information.

SUMMARY

When information is provided based on a coordinate of a QR code, an electronic device continuously detects a position change of the QR code. In certain embodiments, the electronic device consumes resources thereof to continuously track the QR code. Accordingly, the electronic device requires an improved method to track the QR code.

To address the above-discussed deficiencies, it is a primary object to provide apparatus and a method for tracking a marker included in a frame of an image.

According to various embodiments, the electronic device provides an apparatus and a method for tracking a position of a marker in a current frame based on a position of a marker in a previous frame.

According to various embodiments, the electronic device provides an apparatus and a method for tracking a position of a marker in a current frame by applying a scan line scheme to a position of a marker in a previous frame.

In accordance with various embodiments of the present disclosure a method of tracking a marker by an electronic device is provided. The method includes: detecting a position of a marker in a first frame; tracking a position of the marker in a second frame based on the position of the marker detected in the first frame; and estimating a 3D position based on the tracked position of the marker.

The tracking of the position of the marker in the second frame includes: identifying coordinates of edges of the marker detected in the first frame; and tracking the position of the marker in the second frame by using scan lines orthogonal to the edges of the markers detected in the first frame.

The identifying of the coordinates of the edges of the marker detected in the first frame includes: identifying coordinates of corners of the marker detected in the first frame; determining lines connecting the coordinates of the corners of the marker detected in the first frame; and identifying coordinates of the lines.

The detecting of the position of the marker in the first frame includes: converting the first frame into a binary code or gray scale; and detecting the position of the marker based on edge detection or thresholding on the first frame converted into the binary code or gray scale.

The method further includes applying noise reducing to the first frame having passed through the edge detection or thresholding.

The estimating of the 3D position includes estimating the 3D position by comparing a position of a reference marker with the detected position of the marker.

The method further includes reducing noise by applying at least one of a Kalman filter and a particle filter to the estimated 3D position based on a position, spatial speed, rotation, and angular speed of the marker.

The method further includes providing the estimated 3D position to a driven application program.

In accordance with another aspect of the present disclosure, an electronic device for tracking a marker is provided. The electronic device includes: a memory; a camera; and at least one processor for detecting a position of a marker in a first frame of an image acquired through the camera and making a control to store the detected position of the marker in the memory, tracking a position of the marker in a second frame based on the position of the marker detected in the first frame stored in the memory, and estimating a 3D position based on the tracked position of the marker.

The processor identifies coordinates of edges of the marker detected in the first frame stored in the memory, and track the position of the marker in the second frame by using scan lines orthogonal to the edges of the markers detected in the first frame.

The processor identifies coordinates of corners of the marker detected in the first frame stored in the memory, determine lines connecting the coordinates of the corners of the marker detected in the first frame, and identify the coordinates of the edges of the marker by using coordinates of the lines.

The processor converts the first frame into a binary code or gray scale, and detect the position of the marker based on edge detection or thresholding on the first frame converted into the binary code or gray scale.

The processor applies noise reducing to the first frame having passed through the edge detection or thresholding.

The processor estimates the 3D position by comparing a position of a reference marker with the detected position of the marker.

The processor reduces noise by applying at least one of a Kalman filter and a particle filter to the estimated 3D position based on a position, spatial speed, rotation, and angular speed of the marker.

The processor provides the estimated 3D position to a driven application program.

In accordance with various embodiments of the present disclosure, a computer readable recording medium records a program is provided. The program executes operations including detecting a position of a marker in a first frame; tracking a position of the marker in a second frame based on the position of the marker detected in the first frame; and estimating a 3D position based on the tracked position of the marker.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
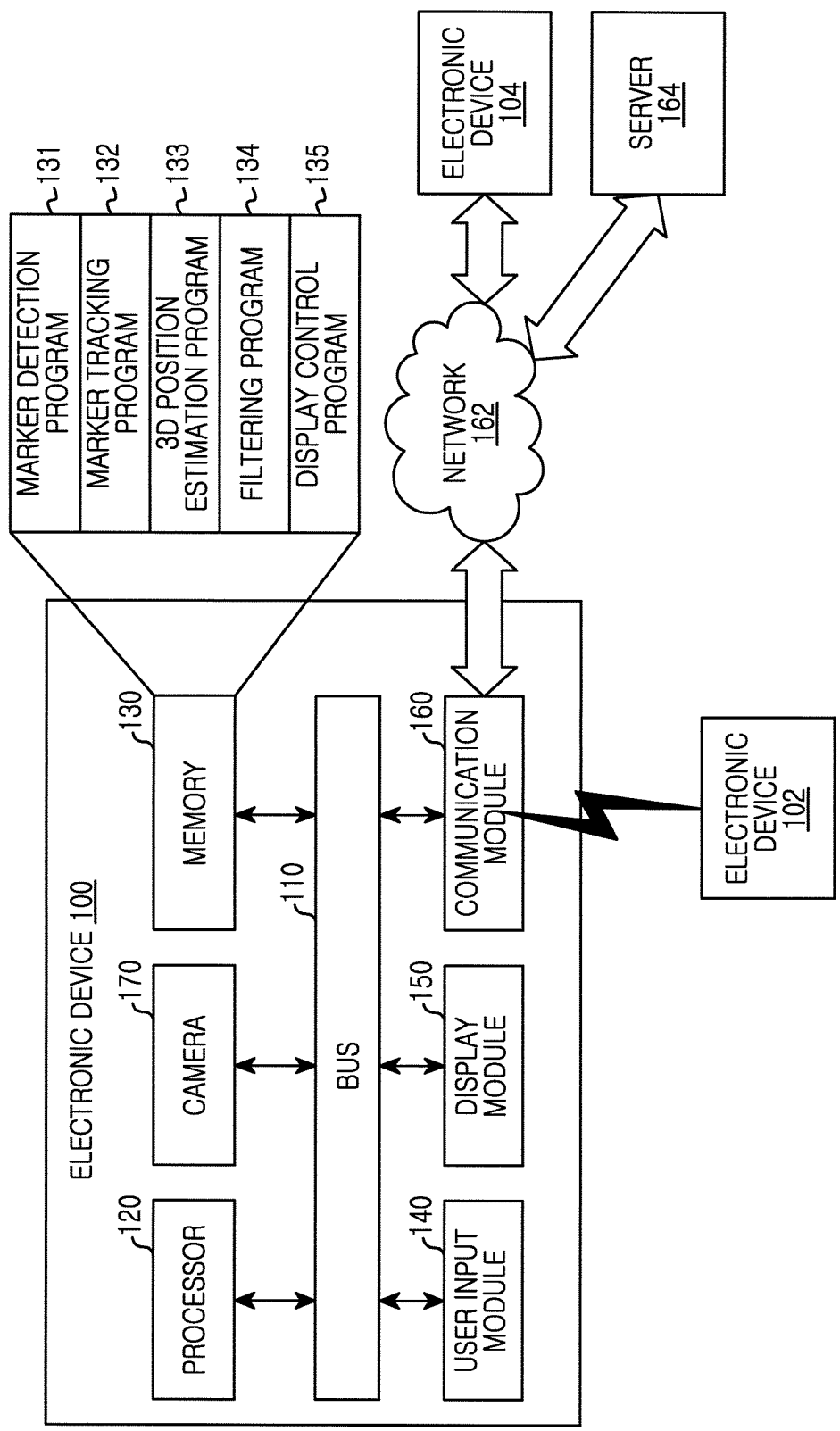
FIG. 1 illustrates an electronic device according to various embodiments of the present disclosure.

FIGS. 1 through 6C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device.

Hereinafter, various embodiments will be described with reference to the accompanying drawings. Although specific embodiments are illustrated in the drawings and related detailed descriptions are discussed in the present disclosure, the present disclosure includes various modifications and several embodiments. Accordingly, the present disclosure is not limited to a specific implementation form and it should be understood that the present disclosure includes all changes or equivalents and substitutes included in the spirit and scope of the present disclosure. In connection with descriptions of the drawings, similar components are designated by the same reference numeral.

For example, the electronic device is one or a combination of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, an electronic bracelet, an electronic necklace, an electronic appessory, a camera, a wearable device, an electronic clock, a wrist watch, a home appliance (for example, refrigerator, air conditioner, cleaner, an artificial intelligence robot, a Television (TV), a Digital Video Disk (DVD) player, an audio player, oven, microwave oven, washing machine, air cleaner, and electronic picture frames), various types of medical devices (for example, Magnetic Resonance Angiography (MRA), Magnetic Resonance Imaging (MRI), Computed Tomography (CT), scanner, an ultrasonic device, and the like), a navigation device, a Global Positioning System (GPS) receiver, an Event Data Recorder (EDR), a Flight Data Recorder (FDR), a set-top box, a TV box (for example, SAMSUNG HOMESYNC, APPLE TV, or GOOGLE TV), an electronic dictionary, a vehicle infotainment device, electronic equipment for a ship (for example, a navigation device for ship, a gyro compass, and the like), avionics, a security device, electronic clothes, an electronic key, a camcorder, game consoles, a Head-Mounted Display (HMD), a flat panel display device, an electronic frame, an electronic album, furniture or a part of buildings/structures having a communication function, an electronic board, an electronic signature receiving device, a wearable device, and a projector. It is obvious to those skilled in the art that the electronic device according to the present disclosure is not limited to the aforementioned devices. It is obvious to those skilled in the art that the electronic device according to the present disclosure is not limited to the aforementioned devices.

FIG. 1 illustrates an electronic device according to various embodiments of the present disclosure.

Referring to FIG. 1, an electronic device 100 includes a bus 110, a processor 120, a memory 130, a user input module 140, a display module 150, a communication module 160, or a camera 170.

The bus 110 is a circuit for connecting components (for example, the bus 110, the processor 120, the memory 130, the user input module 140, the display module 150, the communication module 160, or the camera 170) included in the electronic device 100 and transferring communication (for example, control messages) between the components.

Figure 2:
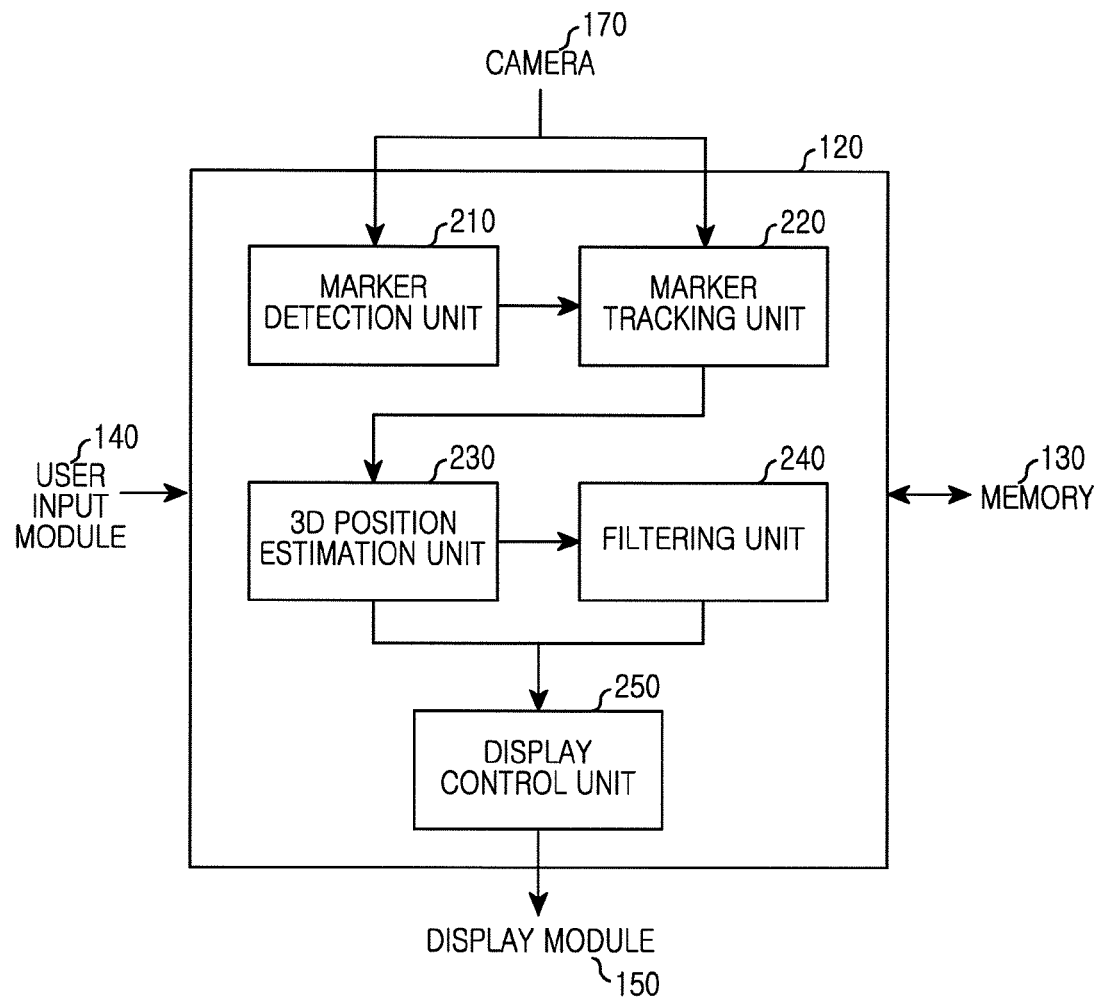
FIG. 2 illustrates a processor according to various embodiments of the present disclosure.

The processor 120 receives commands from the components included in the electronic device 100 through the bus 110, analyze the received commands, and perform calculations or data processing according to the analyzed commands. The processor 120 executes one or more applications stored in the memory 130 and provides services according to the corresponding applications. For example, the processor 120 is configured as illustrated in FIG. 2 to track a marker in an image through the execution of a marker detection program 131, a marker tracking program 132, a 3D position estimation program 133, a filtering program 134, and a display control program 135.

The processor 120 includes one or more Application Processors (APs) or one or more Communication Processors (CPs). The AP and the CP are included in the processor 120 or are included in different integrated circuit (IC) packages, respectively. Further, the APs and the CPs are included in one IC package. The AP controls a plurality of hardware or software components connected to the AP by driving an operating system or an application program and perform processing of various pieces of data including multimedia data and calculations. The AP is implemented by a System on Chip (SoC). The CP performs at least some of the multimedia control functions. Further, the CP distinguishes between and authenticates terminals within a communication network using a subscriber identification module (for example, a SIM card). At this time, the CP provides a user with services including a voice call, a video call, a text message, and packet data. Further, the CP controls data transmission or reception of the communication module 160. The AP or the CP loads commands or data received from at least one of a non-volatile memory and other components connected to each of the AP and the CP in a volatile memory, and processes the loaded commands or data. Further, the AP or the CP stores data received from or generated by at least one of the other components in a non-volatile memory. The CP manages a data link in communication between an electronic device including hardware and other electronic devices connected to the electronic device and performs a function of switching a communication protocol. The CP is implemented by the SoC. The processor 120 further includes a Graphic Processing Unit (GPU).

The memory 130 stores commands or data received from the processor 120 or other components (for example, the user input module 140, the display module 150, the communication module 160, and the camera 170) or generated by the processor 120 or other components. At this time, the memory includes an internal buffer and an external buffer. For example, the memory 130 compresses or decompresses an image acquired through the camera 170 and store the compressed or decompressed image. In another example, the memory 130 stores the position of the marker.

Further, the memory 130 includes the marker detection program 131, the marker tracking program 132, the 3D position estimation program 133, the filtering program 134, and the display control program 135. Each application includes a programming module, and each programming module includes software, firmware, hardware, or a combination of two or more thereof.

The marker detection program 131 includes at least one software component for detecting a marker included in an image. For example, the marker detection program 131 detects a marker in an image acquired through the camera 170. More specifically, the marker detection program 131 converts a frame of the image into binary code or gray scale to detect a position of the marker through edge detection or thresholding. The marker detection program 131 further applies noise reducing after the edge detection or thresholding.

Figure 5A:
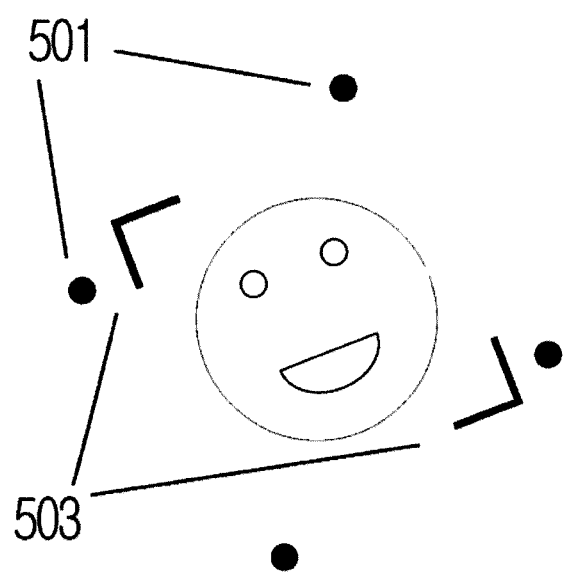
FIGS. 5A and 5B illustrate a process for tracking a marker by an electronic device using scan lines according to various embodiments of the present disclosure.
Figure 5B:
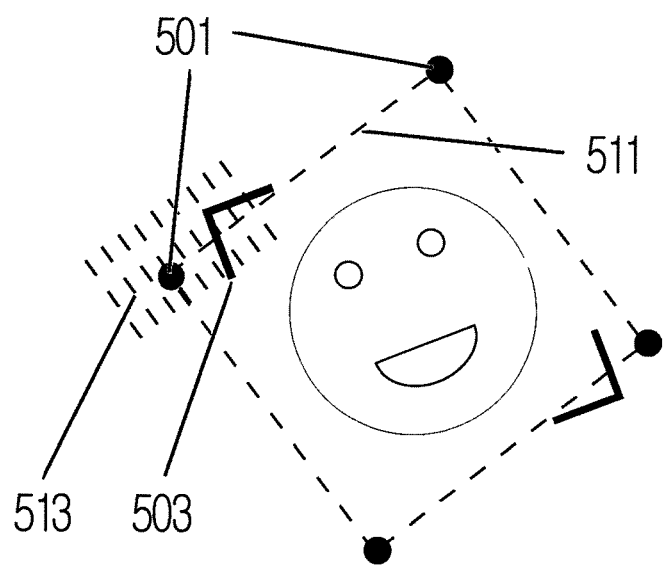

The marker tracking program 132 includes at least one software component for tracking a position of the marker based on the position of the marker detected by the marker detection program 131. For example, when a second frame is currently acquired and a position of the marker is detected in a first frame through the marker detection program 131, the marker tracking program 132 tracks the position of the marker in the current frame (the second frame) based on the position of the marker detected in the first frame. More specifically, referring to FIG. 5A, when the position of the marker is detected in the first frame, the marker tracking program 132 identifies coordinates of edges 501 of the marker detected through the marker detection program 131, and The coordinates of the edges of the detected marker are stored in the memory. After identifying the coordinates of the edges 501 of the marker detected in the first frame, the marker tracking program 132 determines lines 511 connecting the edges 501 of the detected marker as illustrated in FIG. 5B. The marker tracking program 132 tracks a position 503 of the marker in the current frame (the second frame) using scan lines 513 orthogonal to the lines 511.

Figure 6A:
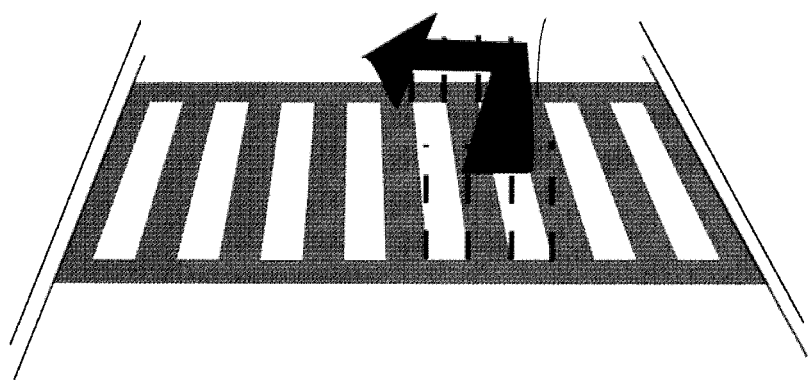
FIGS. 6A, 6B, and 6C illustrate examples in which an electronic device tracks a marker and applies the marker to an application program according to various embodiments of the present disclosure.
Figure 6B:
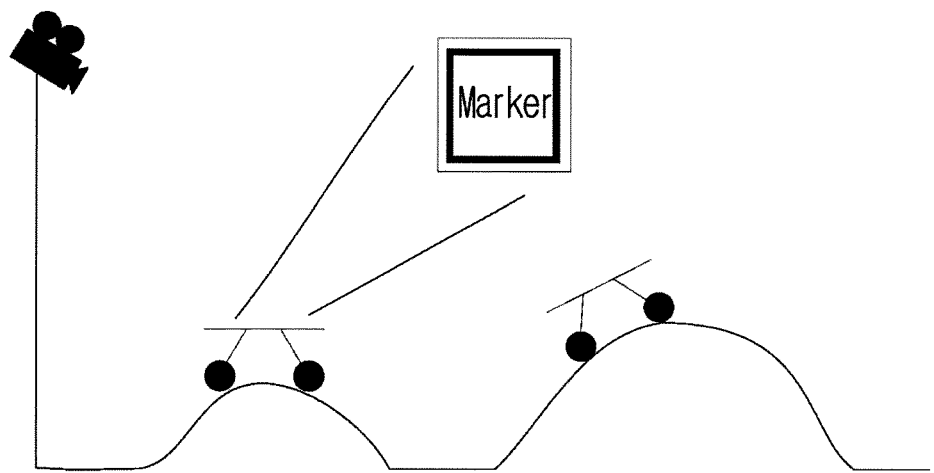
Figure 6C:
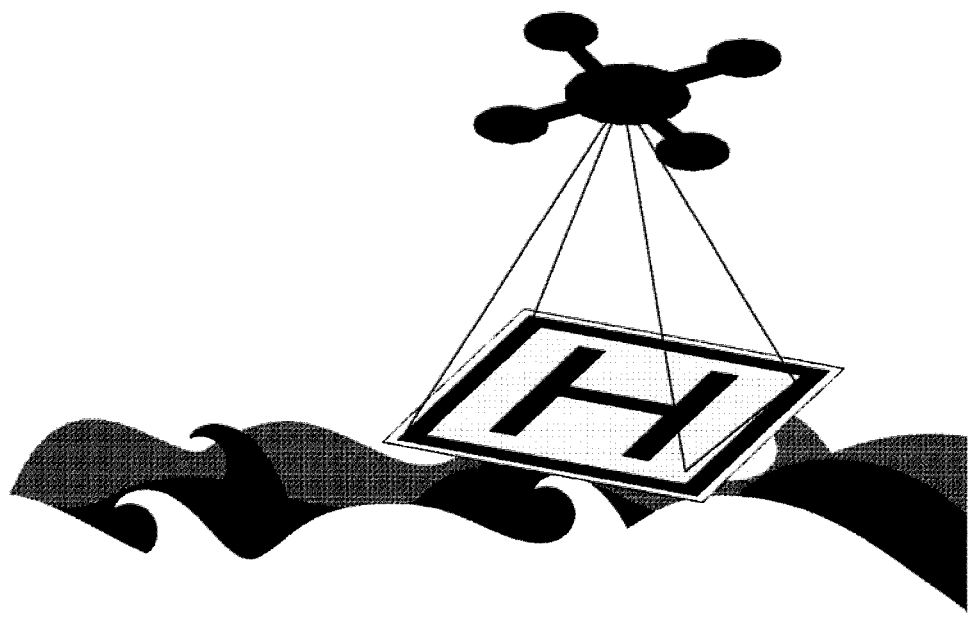

The 3D position estimation program 133 includes at least one software component for estimating a 3D position based on the position of the marker tracked by the marker tracking program 132. For example, the 3D position estimation program 133 estimates a 3D position based on the position of the marker tracked by the marker tracking program 132. The 3D position estimation program 133 provides a 3D position to an application program to display a route along which the movement is made at a crosswalk as illustrated in FIG. 6A, to estimate topography in a construction site as illustrated in FIG. 6B, and to determine a landing position of an aircraft as illustrated in FIG. 6C.

The filtering program 134 includes at least one software component for applying a filter to the 3D position estimated by the 3D position estimation program 133. For example, the filtering program 134 reduces noise by applying at least one of a Kalman filter and a particle filter to the estimated 3D position based on a position, spatial speed, rotation, and angular speed of the marker.

The display control program 135 includes at least one software component for making a control to display at least one piece of display data through the display module 150. For example, the display control program 135 displays display data according to a control of an application program having received the 3D position from the 3D position estimation program 133 through the display module 150.

Further, the memory 130 includes an internal memory or an external memory. The internal memory includes at least one of a volatile memory (for example, a Dynamic Random Access Memory (DRAM), a Static RAM (SRAM), or a Synchronous Dynamic RAM (SDRAM)) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, or a NOR flash memory). The internal memory is a Solid State Drive (SSD) type. The external memory includes at least one of a Compact Flash (CF), a Secure Digital (SD), a Micro Secure Digital (Micro-SD), a Mini Secure Digital (Mini-SD), an extreme Digital (xD) and a memory stick.

The memory 130 further includes a kernel, middleware, and an Application Programming Interface (API). The kernel controls or manages system resources (for example, the bus 110, the processor 120, or the memory 130) used for executing operations or functions implemented in the remaining other programming modules (for example, the middleware, the API, or applications). Further, the kernel provides an interface through which the middleware, API, or applications access individual components of the electronic device 100 to control or manage the components. The middleware serves to mediate between the API or applications and the kernel so that they communicate to exchange data with each other. Further, the middleware performs load balancing for operation requests received from one or more applications by using a method of assigning priorities to the operation requests to first use system resources (for example, the bus 110, the processor 120, or the memory 130) of the electronic device 100. The API corresponds to an interface through which applications control functions provided from the kernel or middleware and includes at least one interface or function for performing a file control, window control, image processing, or text control.

The user input module 140 receives commands or data from the user and transmits the received commands or data to the processor 120 or the memory 130 through the bus 110. For example, the user input module 140 includes a touch panel, a pen sensor, a key, or an ultrasonic input device. For example, the touch panel recognizes a touch input through at least one type of, for example, a capacitive type, a resistive type, an infrared type, and an ultrasonic type. The touch panel further includes a controller. In the capacitive type, the touch panel recognizes proximity hovering as well as a direct touch. The touch panel further includes a tactile layer. At this time, the touch panel provides the user with a tactile reaction. For example, the pen sensor is implemented using a method identical or similar to a method of receiving a touch input of a user or using a separate recognition sheet. For example, the key include a keypad or a touch key. For example, the ultrasonic input device is a device which identifies data by detecting sound waves by a microphone of the electronic device through a pen generating an ultrasonic signal and performs radio recognition.

The display module 150 displays an image, a video, or data for the user. For example, the display module 150 includes a panel or hologram. For example, the panel is a Liquid Crystal Display (LCD) or an Active Matrix Organic Light Emitting Diode (AM-OLED). Further, the panel is implemented to be, for example, flexible, transparent, or wearable. The panel is implemented by one module together with the touch panel. For example, the hologram shows a three-dimensional image in the air using interference of light. In addition, the display module 150 further includes a control circuit for controlling the panel or the hologram.

The display module 150 displays display data according to a control of the display control application 135. The display module 150 displays display data of an application program having received the 3D position from the 3D position estimation program according to a control of the display control program 135.

The communication module 160 connects communication between the electronic device 100 and other electronic devices 102 and 104. The communication module 160 supports a short-range communication protocol (for example, Wi-Fi, BLUETOOTH (BT), or Near Field Communication (NFC)), or network communication 162 (for example, Internet, Local Area Network (LAN), Wide Area Network (WAN), telecommunication network, cellular network, or satellite network, a Plain Old Telephone Service (POTS) or the like).

The camera 170 acquires a subject for photography through an image sensor. An image processor (not shown) corresponds to an Image Signal Processor (ISP) and converts output data (for example, raw data) from the camera 170 into image frame (RGB/YUV) data having a predetermined standard format and provide the converted data to the processor 120. The image processor is included in the camera 170. Further, the image processor is included in the processor 120.

Each of the electronic devices 102 and 104 is a device that is the same as the electronic device 100 (for example, same type device) or another device (for example, different type device).

Additionally, the electronic device further includes a sensor module. The sensor module includes at least one of a gesture sensor, a gyro sensor, an atmospheric pressure sensor, a magnetic sensor, an acceleration sensor, a grip sensor, a proximity sensor, a Red, Greed, and Blue (RGB) sensor, a bio sensor, a temperature/humidity sensor, an illumination sensor, and an Ultra Violet (UV) sensor. Further, the sensor module measures a physical quantity or detects an operation state of the electronic device and converts the measured or detected information into an electrical signal. For example, the sensor module includes an E-nose sensor, an electromyography (EMG) sensor, an electroencephalogram (EEG) sensor, an electrocardiogram (ECG) sensor, or a fingerprint sensor. The sensor module further includes a control circuit for controlling one or more sensors included in the sensor module.

The names of the above described hardware components according to various embodiments vary depending on the type of electronic device. The hardware, according to various embodiments, includes at least one of the above described components, a few of the components can be omitted, or an additional component can be further included. Also, some of the hardware components according to various embodiments can be combined into one entity, which performs functions identical to those of the relevant components before the combination.

FIG. 2 illustrates a processor according to various embodiments of the present disclosure.

As illustrated in FIG. 2, the processor 120 includes a marker detection unit 210, a marker tracking unit 220, a 3D position estimation unit 230, a filtering unit 240, and a display control unit 250.

The marker detection unit 210 detects a marker in an image by executing the marker detection program 131 stored in the memory 130. For example, the marker detection unit 210 detects a marker in an image acquired through the camera 170. More specifically, the marker detection unit 210 converts a frame of the image into binary code or gray scale to detect a position of the marker through edge detection or thresholding. The marker detection unit 210 further applies noise reducing after the edge detection or thresholding.

The marker tracking unit 220 tracks a position of the marker based on the position of the marker detected by the marker detection unit 210 by executing the marker tracking program 132 stored in the memory 130. For example, when a second frame is currently acquired and a position of the marker is detected in a first frame through the marker detection unit 210, the marker tracking unit 220 tracks the position of the marker in the current frame (the second frame) based on the position of the marker detected in the first frame. More specifically, referring to FIG. 5A, when the position of the marker is detected in the first frame, the marker tracking unit 220 identifies coordinates of edges 501 of the marker detected through the marker detection unit 210, and The coordinates of the edges of the detected marker are stored in the memory. After identifying the coordinates of the edges 501 of the marker detected in the first frame, the marker tracking unit 220 determines lines 511 connecting the edges 501 of the detected marker as illustrated in FIG. 5B. Thereafter, the marker tracking unit 220 tracks a position 503 of the marker in the current frame (the second frame) by using scan lines 513 orthogonal to the lines 511.

The 3D position estimation unit 230 estimates a 3D position based on the position of the marker tracked by the marker tracking unit 220 by executing the 3D position estimation program 133 stored in the memory 130. For example, the 3D position estimation unit 230 estimates a 3D position based on the position of the marker tracked by the marker tracking unit 220. The 3D position estimation unit 230 provides a 3D position to an application program to display a route along which the movement is made at a crosswalk as illustrated in FIG. 6A, to estimate topography in a construction site as illustrated in FIG. 6B, and to determine a landing position of an aircraft as illustrated in FIG. 6C.

The filtering unit 240 applies a filter to the 3D position estimated by the 3D position estimation unit 230 by executing the filtering program 134 stored in the memory 130. For example, the filtering unit 240 reduces noise by applying at least one of a Kalman filter and a particle filter to the 3D position estimated by the 3D position estimation unit 230 based on a position, spatial speed, rotation, and angular speed of the marker.

The display control unit 250 displays display data through the display module 150 by executing the display control program 135 stored in the memory 130. For example, the display control unit 250 displays display data according to a control of an application program having received the 3D position from the 3D position estimation unit 230.

Figure 3:
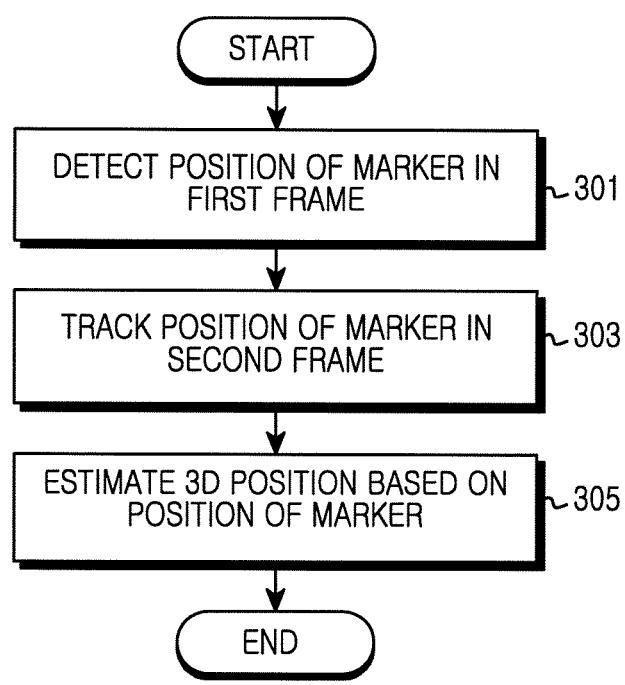
FIG. 3 illustrates a process for tracking a marker by an electronic device according to various embodiments of the present disclosure.

FIG. 3 illustrates a process for tracking a marker by an electronic device according to various embodiments of the present disclosure.

In step 301, the electronic device detects a position of a marker in a first frame. For example, the electronic device detects the position of the marker in the first frame of the image acquired through the camera. The electronic device converts the first frame into binary code or gray scale in order to detect the position of the marker in the first frame and perform edge detection or thresholding. Additionally, the electronic device applies noise reducing to the first frame which has passed through the edge detection or thresholding.

In step 303, the electronic device tracks a position of the marker in a second frame. For example, the electronic device identifies coordinates of edges of the marker detected in the first frame and tracks a position of the marker in the second frame by using scan lines orthogonal to the edges of the marker detected in the first frame.

In step 305, the electronic device track a 3D position based on the position of the marker. For example, the electronic device estimates the 3D position by comparing a position of a reference marker with the position of the detected marker. Additionally, the electronic device reduces noise by applying at least one of a Kalman filter and a particle filter to the 3D position estimated based on a position, spatial speed, rotation, and angular speed of the marker. The electronic device provides the estimated 3D position to the driven application program.

Figure 4:
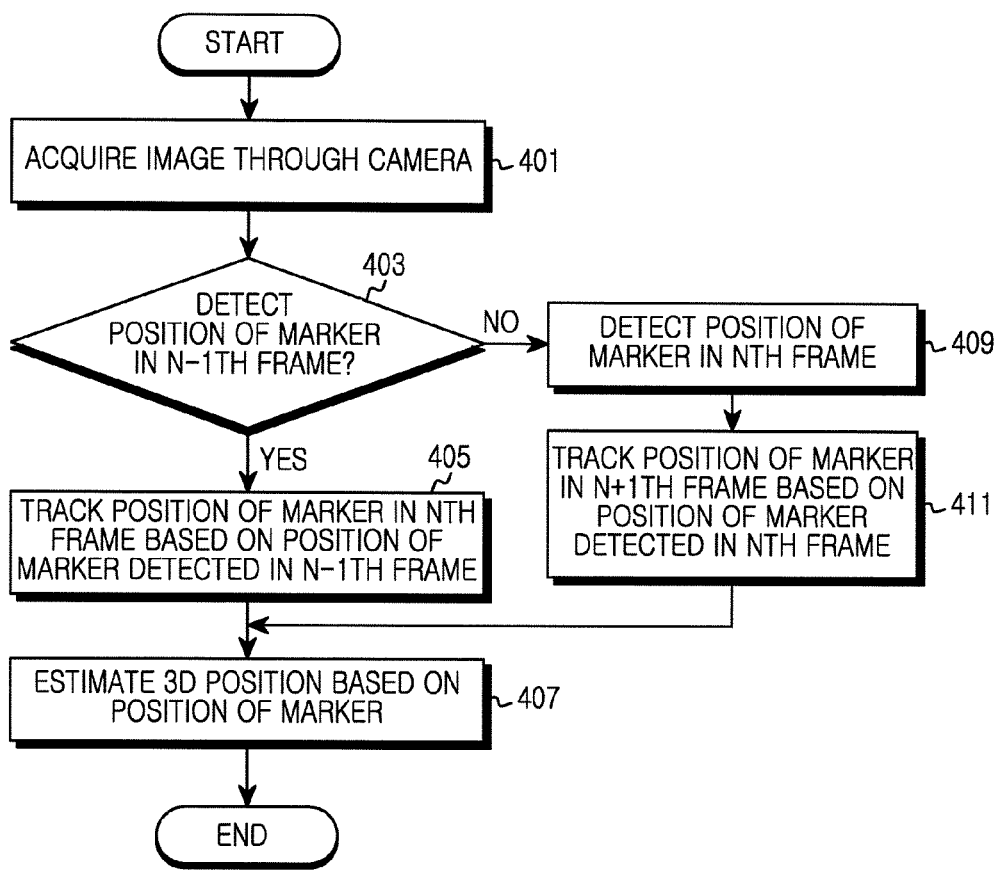
FIG. 4 illustrates a process for tracking a marker by an electronic device according to various embodiments of the present disclosure.

FIG. 4 illustrates a process for tracking a marker by an electronic device according to various embodiments of the present disclosure.

In step 401, the electronic device acquires an image through the camera in step 401. The electronic device acquires the image through the camera in the unit of frames. Further, the image acquired through the camera is a decompressed or compressed type.

Thereafter, in step 403, the electronic device identifies whether a position of the marker is detected in an N–1th frame. For example, when a second frame is currently acquired, the electronic device identify whether the position of the marker is detected in the first frame. A process of identifying whether the position of the marker is detected in the N–1th frame is performed to identify whether a position of the marker detected in a previous frame is used to track the position of the marker in the current frame.

In step 405, when the position of the marker is detected in the N–1th frame, the electronic device tracks a position of the marker in an Nth frame based on the position of the marker detected in the N–1th frame. For example, when the second frame is currently acquired and the position of the marker is detected in the first frame, the electronic device tracks the position of the marker in the current frame based on the position of the marker detected in the first frame. More specifically, referring to FIG. 5A, when the position of the marker is detected in the first frame, the electronic device identifies coordinates of edges 501 of the marker detected in the first frame, and the coordinates of the edges of the detected marker are stored in the memory. After identifying the coordinates of the edges 501 of the marker detected in the first frame, the electronic device determines lines 511 connecting the edges 501 of the detected marker as illustrated in FIG. 5B. The electronic device tracks a position 503 of the marker in the current frame (the second frame) by using scan lines 513 orthogonal to the lines 511.

In step 409, when the position of the marker is not detected in the N–1th frame, the electronic device detects the position of the marker in the Nth frame. For example, when the second frame is currently acquired and the position of the marker is not detected in the first frame, the electronic device detects the position of the marker in the current frame (the second frame). More specifically, the electronic device converts the second frame into binary code or gray scale to detect a position of the marker through edge detection or thresholding. The electronic device further applies noise reducing after the edge detection or thresholding.

In step 411, when the position of the marker is detected in the Nth frame, the electronic device track a position of the marker in an N+1th frame based on the position of the marker detected in the Nth frame. For example, when the position of the marker is detected in the second frame, the electronic device tracks the position of the marker in a current frame (a third frame) based on the position of the marker detected in the second frame. More specifically, referring to FIG. 5A, when the position of the marker is detected in the second frame, the electronic device identifies coordinates of edges 501 of the marker detected in the second frame, and the coordinates of the edges of the detected marker are stored in the memory. After identifying the coordinates of the edges 501 of the marker detected in the second frame, the electronic device determines lines 511 connecting the edges 501 of the detected marker as illustrated in FIG. 5B. Thereafter, electronic device tracks a position 503 of the marker in the current frame (the third frame) by using scan lines 513 orthogonal to the lines 511.

In step 407, the electronic device estimates a 3D position based on the position of the marker. For example, the electronic device estimates the 3D position based on the position of the marker detected in the previous frame (the first frame in step 405 or the second frame in step 409). The 3D position is used for displaying a route along which the movement is made at a crosswalk as illustrated in FIG. 6A, estimate topography in a construction site as illustrated in FIG. 6B, and determining a landing position of an aircraft as illustrated in FIG. 6C.

As described above, by tracking the position of the marker in the current frame through the use of the position of the marker detected in the previous frame, the electronic device does not need to perform a process of detecting the marker in every frame, thereby reducing resource waste which is generated in the process of detecting the marker.

Methods stated in claims and/or specifications according to various embodiments are implemented by hardware, software, or a combination of hardware and software.

In the implementation of software, a computer-readable storage medium for storing one or more programs (software modules) is provided. The one or more programs stored in the computer-readable storage medium are configured for execution by one or more processors within the electronic device. The one or more programs include instructions for allowing the electronic device to perform methods stated in claims and/or specifications according to various embodiments.

The programs (software modules or software) are stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, the programs are stored in a memory configured by a combination of some or all of the listed components. Further, a plurality of configuration memories is included.

In addition, the programs are stored in an attachable storage device which accesses the electronic device through communication networks such as the Internet, Intranet, Local Area Network (LAN), Wide LAN (WLAN), and Storage Area Network (SAN) or a combination thereof. The storage device accesses the electronic device through an external port.

Further, a separate storage device on a communication network accesses a portable electronic device.

Although specific exemplary embodiments have been described in the detailed description of various embodiments of the present disclosure, various changes and modifications can be made without departing from the spirit and scope of various embodiments of the present disclosure. Therefore, the scope of the present disclosure should not be limited to the aforementioned embodiments, but should be defined by the equivalents to the appended claims as well as the claims.

What is claimed is:

1. A method of tracking a marker by an electronic device, the method comprising:
    acquiring a previous frame of a current frame and the current frame in an image having a marker that is a pattern representing predetermined information;
    detecting a position of a marker in the previous frame by detecting edges of the marker in the previous frame;
    tracking a position of the marker in the current frame based on the position of the marker detected in the previous frame; and
    estimating a 3D position based on the tracked position of the marker in the current frame to detect the predetermined information from the marker based on the 3D position.

2. The method of claim 1, wherein tracking the position of the marker in the current frame comprises:
    identifying coordinates of edges of the marker detected in the previous frame; and
    tracking the position of the marker in the current frame by using scan lines orthogonal to the edges of the markers detected in the previous frame.

3. The method of claim 2, wherein identifying the coordinates of the edges of the marker detected in the previous frame comprises:
    identifying coordinates of corners of the marker detected in the previous frame;
    determining lines connecting the coordinates of the edges of the marker detected in the previous frame; and
    identifying coordinates of the lines.

4. The method of claim 1, wherein detecting the position of the marker in the previous frame comprises:
    converting the previous frame into a binary code or gray scale; and
    detecting the position of the marker based on edge detection or thresholding on the previous frame converted into the binary code or gray scale.

5. The method of claim 4, further comprising applying noise reducing to the previous frame having passed through the edge detection or thresholding.

6. The method of claim 1, wherein estimating the 3D position comprises estimating the 3D position by comparing a position of a reference marker with the detected position of the marker.

7. The method of claim 1, further comprising reducing noise by applying at least one of a Kalman filter and a particle filter to the estimated 3D position based on a position, spatial speed, rotation, and angular speed of the marker.

8. The method of claim 1, further comprising providing the estimated 3D position to a driven application program.

9. The method of claim 1, further comprising:
    when the position of the marker is not detected in the previous frame, detecting a position of the marker in the current frame; and
    tracking a position of a marker in a third frame based on the position of the marker detected in the current frame.

10. The method of claim 9, wherein detecting the position of the marker in the current frame comprises:
    converting the current frame into a binary code or gray scale; and
    detecting the position of the marker based on edge detection or thresholding on the current frame converted into the binary code or gray scale.

11. An electronic device for tracking a marker, the electronic device comprising:
    a memory;
    a camera; and
    at least one processor configured to:
        acquire a previous frame and a current frame in an image having a marker that is a pattern representing predetermined information,
        detect a position of a marker in the previous frame by detecting edges of the marker in the previous frame through the camera and store the detected position of the marker in the memory,
        track a position of the marker in the current frame based on the position of the marker detected in the previous frame stored in the memory, and
        estimate a 3D position based on the tracked position of the marker in the current frame to detect the predetermined information from the marker based on the 3D position.

12. The electronic device of claim 11, wherein the processor is further configured to:
    identify coordinates of edges of the marker detected in the previous frame stored in the memory; and
    track the position of the marker in the current frame by using scan lines orthogonal to the edges of the markers detected in the previous frame.

13. The electronic device of claim 12, wherein the processor is further configured to:
    identify coordinates of corners of the marker detected in the previous frame stored in the memory;
    determine lines connecting the coordinates of the corners of the marker detected in the previous frame; and
    identify the coordinates of the edges of the marker by using coordinates of the lines.

14. The electronic device of claim 11, wherein the processor is further configured to:
    convert the previous frame into a binary code or gray scale; and
    detect the position of the marker based on edge detection or thresholding on the previous frame converted into the binary code or gray scale.

15. The electronic device of claim 14, wherein the processor is further configured to apply noise reducing to the previous frame having passed through the edge detection or thresholding.

16. The electronic device of claim 11, wherein the processor is further configured to estimate the 3D position by comparing a position of a reference marker with the detected position of the marker.

17. The electronic device of claim 11, wherein the processor is further configured to reduce noise by applying at least one of a Kalman filter and a particle filter to the estimated 3D position based on a position, spatial speed, rotation, and angular speed of the marker.

18. The electronic device of claim 11, wherein the processor is further configured to provide the estimated 3D position to a driven application program.

19. The electronic device of claim 11, wherein the processor is further configured to:
when the position of the marker is not detected in the previous frame, detect a position of the marker in the current frame; and
track a position of a marker in a third frame based on the position of the marker detected in the current frame.

20. The electronic device of claim 19, wherein the processor is further configured to:
convert the current frame into a binary code or gray scale; and
detect the position of the marker based on edge detection or thresholding on the current frame converted into the binary code or gray scale.

* * * * *